United States Patent
Pardo et al.

(10) Patent No.: US 10,427,130 B2
(45) Date of Patent: Oct. 1, 2019

(54) HYDROTHERMAL CARBONIZATION METHOD AND DEVICE WITH OPTIMISED SLUDGE AND STEAM MIXING

(71) Applicant: SUEZ INTERNATIONAL, Paris la Defense (FR)

(72) Inventors: Pierre Emmanuel Pardo, Orsay (FR); Jean-Louis Bourdais, Chateaubriant (FR)

(73) Assignee: SUEZ INTERNATIONAL, Paris (FR)

( * ) Notice: Subject to any disclaimer, the term of this patent is extended or adjusted under 35 U.S.C. 154(b) by 89 days.

(21) Appl. No.: 15/325,009

(22) PCT Filed: Jun. 3, 2016

(86) PCT No.: PCT/EP2016/062702
§ 371 (c)(1),
(2) Date: Jan. 9, 2017

(87) PCT Pub. No.: WO2016/193462
PCT Pub. Date: Dec. 8, 2016

(65) Prior Publication Data
US 2017/0210625 A1   Jul. 27, 2017

(30) Foreign Application Priority Data

Jun. 5, 2015 (FR) .................................... 15 55146

(51) Int. Cl.
| | | |
|---|---|---|
| *C01B 31/02* | (2006.01) | |
| *B01J 19/24* | (2006.01) | |
| *C02F 11/10* | (2006.01) | |
| *C10L 9/08* | (2006.01) | |
| *F23G 5/027* | (2006.01) | |
| *F23G 7/00* | (2006.01) | |
| *F23L 7/00* | (2006.01) | |
| *B01J 19/00* | (2006.01) | |
| *C01B 32/05* | (2017.01) | |

(52) U.S. Cl.
CPC ....... *B01J 19/2455* (2013.01); *B01J 19/0013* (2013.01); *C01B 32/05* (2017.08); *C02F 11/10* (2013.01); *C10L 9/086* (2013.01); *F23G 5/027* (2013.01); *F23G 5/0276* (2013.01); *F23G 7/001* (2013.01); *F23L 7/005* (2013.01); *B01J 2219/00087* (2013.01); *C02F 2303/06* (2013.01); *Y02W 10/40* (2015.05)

(58) Field of Classification Search
CPC ..................................................... C01B 32/05
See application file for complete search history.

(56) References Cited

U.S. PATENT DOCUMENTS

| 8,603,204 B2 * | 12/2013 | Ruger ..................... C10B 53/02 48/61 |
| 8,673,112 B2 | 3/2014 | Nilsen et al. |
| 9,238,583 B2 * | 1/2016 | Vyskocil ................. C10L 9/086 |
| 2016/0052815 A1 | 2/2016 | Pardon et al. |
| 2016/0214880 A1 | 7/2016 | Chauzy et al. |

FOREIGN PATENT DOCUMENTS

| FR | 3 010 403 A1 | 3/2015 |
| WO | 2010/092040 A1 | 8/2010 |
| WO | 2014/135734 A2 | 9/2014 |
| WO | 2014/178028 A1 | 11/2014 |

OTHER PUBLICATIONS

Kunio Yoshikawa: "The Second InteHydrothermal Treatment of Municipal Solid Waste and Sewage Sludge to Produce Solid fuel and Liquid Fertilizer", The Second International Energy 2030 Conference, Nov. 4, 2008 XP055099029.
International Search Report, dated Aug. 2, 2016, from corresponding PCT application.

* cited by examiner

*Primary Examiner* — Stuart L Hendrickson
(74) *Attorney, Agent, or Firm* — Young & Thompson

(57) ABSTRACT

A method of continuous hydrothermal carbonization of sludge containing organic matter involves a step of hydrothermal reaction carried out in a reactor, and at least one cooling step in which the sludge having undergone the hydrothermal reaction step is cooled. The hydrothermal reaction step includes: a step of injection of sludge in which the sludge is injected into the reactor by a first inlet; a step of injection of steam in which steam is injected into the reactor by a second inlet, the second inlet being distinct from the first inlet; a step of circulation, in which a mixture consisting of the sludge and the steam injected into the reactor is placed in circulation within the reactor; a step of continuous extraction of at least a portion of the mixture contained in the reactor by a sludge outlet. Also disclosed is a device for carrying out such a method.

14 Claims, 2 Drawing Sheets

Figure 1:
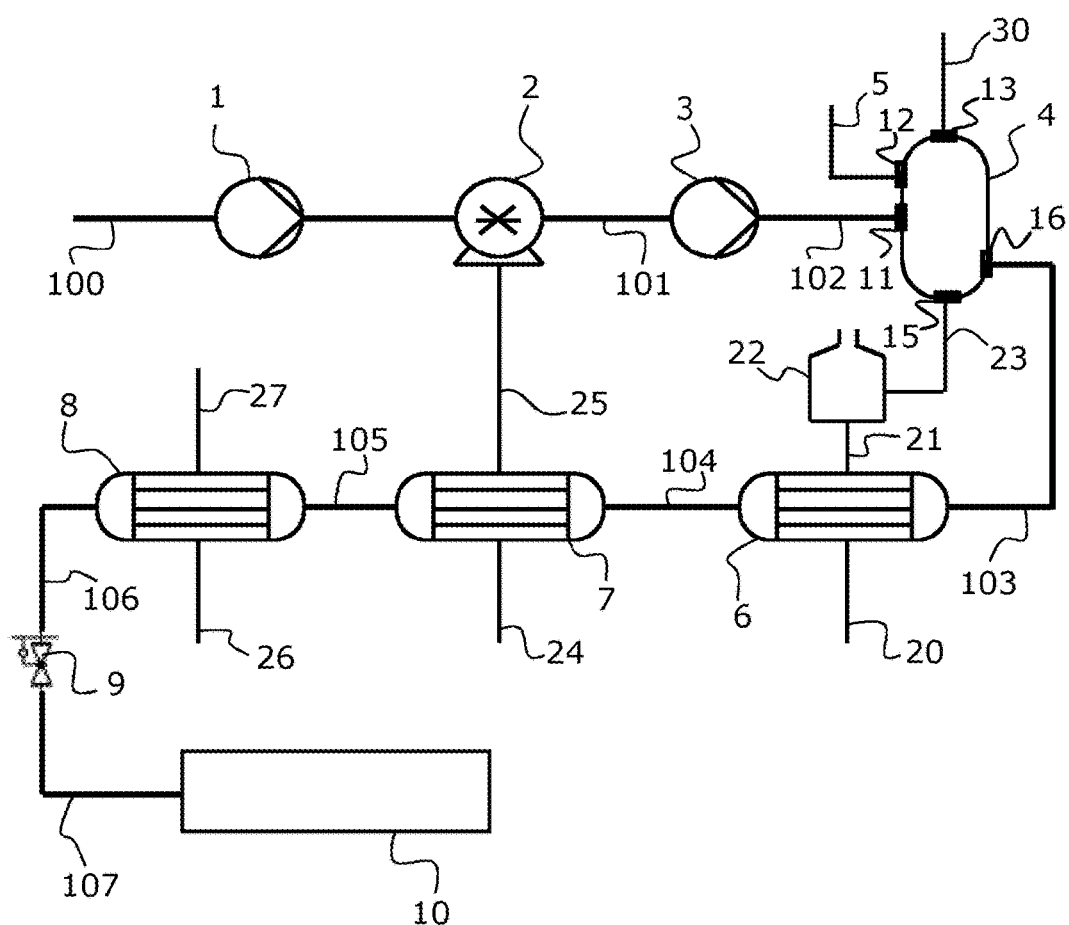

HYDROTHERMAL CARBONIZATION METHOD AND DEVICE WITH OPTIMISED SLUDGE AND STEAM MIXING

TECHNICAL FIELD

The present invention concerns a method and a device for hydrothermal carbonization.

The field of the invention is more particularly but not limited to that of the treatment of sludge heavily loaded with organic material, for example that coming from processes of decontamination of urban or industrial waste waters, or sewage cleaning operations. Such a treatment is intended to reduce the volume of the sludge, to stabilize it in a biological and physicochemical respect, and to produce by-products which can be marketed.

More particularly, the invention concerns the field of the method and a device for continuous hydrothermal carbonization of sludge containing organic matter.

PRIOR ART

The prior art has developed two families of treatment:
thermal hydrolysis,
hydrothermal carbonization.

The technique of thermal hydrolysis of sludge was created by Porteous in the early 20th century. This technique implements pressurized reactors, operating in sequence. Typically, the sludge is pumped into a first reactor in which the steam produced by a boiler is injected until a temperature of around 180° C. is obtained for a pressure of 1.5 MPa inside this first reactor, the temperature there is then maintained for 30 minutes, and then the sludge is evacuated under its own pressure through a heat exchanger. This heat exchanger is used to recover the heat contained in the sludge leaving the first reactor and to reheat the sludge before it enters a second reactor. Many modifications and improvements have occurred since then to improve the productivity and ensure a continuous operation. The hydrolyzed sludge, that is the sludge having undergone such a treatment in a reactor, is then subjected to biological treatments, for example, anaerobic digestion to reduce the quantities of sludge by producing biogas from it.

The technique of hydrothermal carbonization (HTC) is similar to thermal hydrolysis, but does not aim to prepare the sludge with a view to its digestion, but rather to transform the sludge into carbon-neutral biochar of high quality, by the use of heat and a pressure generally higher than in thermal hydrolysis, and by ensuring a longer dwell time for the sludge than that of thermal hydrolysis (several hours) and generally in the presence of a reagent.

The HTC technique also makes it possible to produce biochar, a product resembling humus, which can be used to amend agricultural soil and sequester CO2. The technique of hydrothermal carbonization was described in 1913 by Friedrich Bergius, which won him the Nobel Prize for chemistry in 1931.

There is known in the prior art the patent FR 3010403 which describes a method and a device for thermal hydrolysis of sludge containing organic matter, said method involving steps consisting in:
performing simultaneously an injection of recuperation steam in said sludge and a mixing of said sludge with said recuperation steam by means of a primary dynamic injector-mixer so as to obtain a uniform primary mixture;
performing simultaneously an injection of live steam in said uniform primary mixture and a mixing of said uniform primary mixture with said live steam by means of a secondary dynamic injector-mixer so as to obtain a uniform secondary mixture;
routing said uniform secondary mixture to a pressurized tube reactor and causing the substantially piston flow movement of this uniform secondary mixture in said tube reactor for a sufficient dwell time and at a sufficient temperature to permit a thermal hydrolysis of the organic matter present in this uniform secondary mixture;
producing said recuperation steam within means of production of recuperation steam from said uniform secondary mixture obtained at the outlet of said tube reactor;
cooling said uniform secondary mixture at its outlet from said means of production of recuperation steam at a temperature enabling a subsequent digestion of the hydrolyzed organic matter which it contains.

The American patent U.S. Pat. No. 8,673,112 also describes a method for thermal hydrolysis consisting in:
(i) supplying biomass (particularly sludge) in approximately continuous manner so that it can undergo a first step of preheating, and preheating it,
(ii) moving the preheated biomass sequentially into at least two reactors,
(iii) heating and pressurizing one reactor by addition of steam,
(iv) maintaining the reactors at a certain temperature and pressure for a certain time,
(v) moving the heated and pressurized biomass coming from the reactors to a first tank for decompression without any substantial reduction of pressure and rapid decompression of the biomass, by means of a nozzle, in order to disintegrate it,
(vi) transferring the biomass from the first decompression tank to a second decompression tank whose pressure is less than the pressure of the first decompression tank,
(vii) and taking the biomass so treated to a downstream installation for it to undergo further treatment.

This American patent U.S. Pat. No. 8,673,112 also concerns a device for the thermal treatment of the biomass.

The international patent application WO 2014135734 describes a method which runs continuously for the thermal hydrolysis of organic matter, comprising a preheating step, a further reaction step and a depressurization step. The preheating step involves a recirculation of the organic matter being hydrolyzed in a first recirculation circuit; the reaction step involves a recirculation in a second recirculation circuit of the organic matter extracted from the first recirculation circuit by subjecting it to a certain pressure and to a certain temperature; and the depressurization step involves a decompression undergone by the organic matter extracted continuously from the second circuit.

Drawbacks of the Solutions of the Prior Art

The solutions of the prior art have been developed primarily for a treatment by thermal hydrolysis, rather than by hydrothermal carbonization. They involve methods where the conditions of pressure and temperature are intermediate, typically 0.6 MPa and 160° C.

These solutions are not entirely satisfactory, especially for higher temperatures and pressures, since they involve a major input of steam, during the injection of the biomass (or sludge) into the reactor. This translates into a poorly controlled energy consumption and a higher operating cost, as well as a degraded dryness, the dryness being defined as the content of dry matter of the biomass or sludge.

Furthermore, the sludge introduced into the reactor may contain solid debris, especially mineral aggregates, which may clog the inlet of the reactor or ruin the interior structures of the reactor. The solutions of the prior art are not able to reduce the risks of clogging or wearing of the reactor.

Finally, the injector-mixers needed to homogenize the mixture of sludge and steam are costly and fragile apparatus, especially when they need to operate at elevated temperatures and pressures such as are required for hydrothermal carbonization, where the tightness of the stuffing boxes becomes hard to realize.

Moreover, a "piston flow" operation is hard to achieve for substantial dwell times.

The goal of the present invention is to solve at least one of the aforementioned problems or drawbacks.

DISCLOSURE OF THE INVENTION

For this, the invention proposes a method of continuous hydrothermal carbonization of sludge containing organic matter, said sludge having a dryness between 10 and 30%, said method involving a step of hydrothermal reaction carried out in a reactor (and preferably at least one cooling step in which the sludge having undergone the hydrothermal reaction step is cooled), the hydrothermal reaction step involving the following steps:
  a step of injection of sludge in which the sludge is injected into the reactor by a first inlet,
  a step of injection of steam in which steam is injected into the reactor by a second inlet, the second inlet being distinct from the first inlet,
  a step of placing in circulation, in which a mixture consisting of the sludge and the steam injected into the reactor is placed in circulation within the reactor,
  a step of continuous extraction, especially outside of during the startup phase, of at least a portion of the mixture contained in the reactor by a sludge outlet.

In this description, by the phrase "continuous extraction" is meant a continuous extraction with an optionally variable flow rate, preferably controlled by the operating parameters of the reactor. Such a continuous extraction may be interrupted temporarily when the settings are unable to restore the equilibrium of the hydrothermal carbonization process. The continuous extraction is not a sequential extraction, and it is not an extraction by lot or by "batch".

The same reasoning applies to the phrase "continuous introduction", that is, one can replace in the preceding paragraph the word "extraction" with the word "introduction".

The method may further involve a step of preheating in which the temperature of the sludge prior to its injection into the reactor is raised up to a temperature of preheating.

Preferably, the temperature of preheating can be greater than 100° C., more preferably greater than 150° C., and the pressure of the sludge during the preheating step may be greater than 0.1 MPa, more preferably greater than 0.2 MPa.

During the steam injection step, the steam may be injected in counterflow to the mixture circulating in the reactor (preferably in the opposite direction).

In one mode of realization, the step of placing in circulation is carried out to obtain a uniformly mixed flow.

Preferably, the method may further involve a step of heating of water in which heat contained in the sludge extracted from the reactor is transferred to water by means of a heat exchanger, and in which the water so heated is used to produce the steam used during the step of steam injection.

The method may further involve a step of injection of reagent in which a reagent, especially an acid, is injected into the reactor in order to maintain the pH of the sludge contained in the reactor at a value less than 6.

Furthermore, the method may further involve a step of injection of reagent in which a reagent, especially a base, is injected into the reactor in order to maintain the pH of the sludge contained in the reactor at a value greater than 8.

The invention also concerns a device for continuous hydrothermal carbonization of sludge containing organic matter, said sludge having a dryness between 10 and 30% by weight of dry matter, said device comprising a reactor, the reactor comprising:
  a first inlet designed to inject the sludge into the reactor,
  a second inlet designed to inject steam directly into the reactor, the second inlet being distinct from the first inlet,
  means of placing in circulation, designed to place a mixture consisting of the sludge and the steam injected into the reactor in circulation within the reactor, and
  a sludge outlet designed to continuously extract at least a portion of the mixture contained in the reactor from it.

According to one advantageous characteristic, this device according to the invention may further comprise a preheating device designed to raise the temperature of the sludge upstream from the first inlet by injection of steam into the sludge upstream from the reactor.

According to another advantageous characteristic, the device according to the invention may further comprise an additional heat exchanger designed to generate steam by utilizing the heat contained in the sludge extracted from the reactor, this steam being steam injected into the sludge upstream from the reactor by the preheating device.

Advantageously, the device according to the invention may further comprise a heat exchanger and a boiler, this heat exchanger being designed to transfer heat contained in the sludge extracted from the reactor to water circulating between this heat exchanger and the boiler, the boiler being designed to furnish the steam injected directly into the reactor.

In one advantageous mode of realization, the device according to the invention may further comprise a cooldown apparatus designed to cool the sludge extracted from the reactor, this cooldown apparatus being mounted downstream from the heat exchanger and the additional heat exchanger.

The device according to the invention may further comprise an economizer designed to transfer the heat contained in the sludge extracted from the reactor to water circulating between this economizer and, on the one hand, the additional heat exchanger, and, on the other hand, the heat exchanger.

The economizer is preferably mounted downstream from the additional heat exchanger.

The economizer is preferably mounted upstream from the cooldown apparatus.

DESCRIPTION OF THE FIGURES AND EMBODIMENTS

Figure 2:
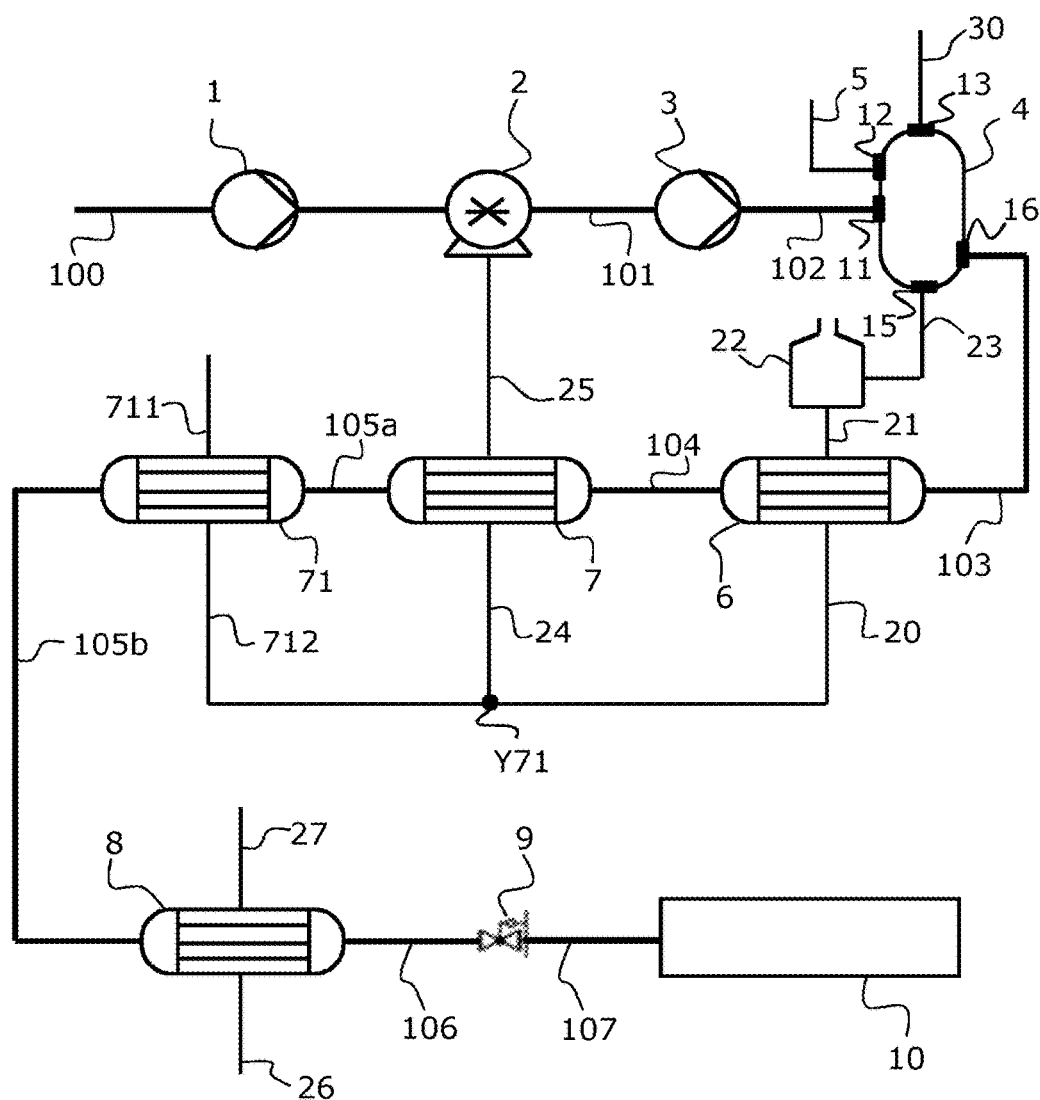

Other advantages and features of the invention will appear upon perusal of the detailed description of embodiments and modes of implementation which are in no way limiting, and the following drawings:

FIG. 1 is a schematic view of a first mode of realization of a hydrothermal carbonization layout according to the invention, FIG. 2 is a schematic view of a second mode of realization of a hydrothermal carbonization layout according to the invention.

The modes of implementation described below are in no way limiting, and in particular it is possible to consider variants of the invention comprising only a selection of described characteristics in isolation from other described characteristics (even if this selection is isolated from a phrase containing those other characteristics), if this selection of characteristics is sufficient to provide a technical advantage or to differentiate the invention from the prior art. This selection will comprise at least one characteristic, preferably a functional one without structural details, or with only a portion of the structural details if that portion alone is sufficient to provide a technical advantage or to differentiate the invention from the prior art.

In the present description of modes of implementation and variants, the steam is by default water vapor.

By default, all pressures indicated in the present description are absolute pressures.

FIG. 1 is an example of a device for continuous hydrothermal carbonization of sludge according to the invention. This device comprises a reactor 4 designed to carry out a hydrothermal reaction step.

This hydrothermal reaction step involves the following steps:
- a step of injection of sludge in which the sludge is injected into the reactor 4 by a first inlet 11,
- a step of injection of steam in which steam is injected into the reactor 4 by a second inlet 15, the second inlet 15 being distinct from the first inlet 11,
- a step of placing in circulation, in which a mixture consisting of the sludge and the steam injected into the reactor 4 is placed in circulation within the reactor 4,
- a step of continuous extraction of at least a portion of the mixture contained in the reactor 4 by a sludge outlet 16.

In the present description, the term "circulation" of sludge, of a mixture, or of a liquid in the reactor 4 designates any kind of movement of this sludge, this mixture, or this liquid in the reactor 4.

In the present description, the phrase "circulation path" designates the path along which this movement of any kind is performed in the reactor.

In the present description, the phrase "placing in circulation" of the sludge, of the mixture, or of a liquid in the reactor means creating or maintaining, directly inside the reactor 4, of the circulation (i.e. the movement) of the sludge, of the mixture, or of the liquid in the reactor, preferably regardless of the amplitude and the direction of the speed of introduction of the sludge into the reactor 4 by the first inlet 11.

By circulation of sludge is typically meant in this mode of realization a relative displacement of sludge defining a mean speed of displacement of sludge Vd within the reactor 4 typically from 0.1 to 3 m/s, a mean speed of injection of sludge Ve by the first inlet 11 typically from 0.005 to 0.1 m/s, or also a ratio Vd/Ve typically from 5 to 300.

The sludge injected into the reactor 4 by the first inlet 11 is channeled as described below.

First of all, the sludge, containing organic matter, comes for example from a hopper (not shown) and is channeled into a conduit 100 (inlet of the device), for example by gravity. The sludge arriving in the conduit 100 typically has a dryness by weight of dry matter between 10 and 30%, typically between 18 and 24%. This sludge is channeled to a preheating device 2 in continuous fashion by an apparatus 1 such as a pump, a worm screw, an apparatus using gravity, a mechanical conveyor, or any means enabling a channeling of the sludge to the preheating device 2. This apparatus 1, in the example of FIG. 1, is a pump.

The preheating device 2 is designed to perform a preheating step in which the temperature of the sludge prior to its injection into the reactor 4 is raised up to a preheating temperature. The preheating temperature in this example is greater than 100° C., and the pressure of the sludge during this preheating step is greater than 0.1 MPa.

Thus, the preheating device 2 makes it possible to raise the temperature of the sludge upstream from the first inlet 11 by injection of steam into the sludge upstream from the reactor 4. The steam so injected by this preheating device 2 is preferably at low pressure, typically at pressure between 0.1 MPa and 1 MPa, typically between 0.1 MPa and 0.5 MPa. The preheating device 2 can thus be an apparatus for reheating of the sludge by direct heat exchange between the sludge and the steam. The steam used by the preheating device 2 typically has a temperature between 100° C. and 180° C., typically between 100° C. and 120° C.

The preheating device 2 may be comprised of any static or dynamic apparatus for steam injection such as a confined tubular chamber with static baffles, a dynamic mixer with rotating blades, or it can also implement multiple steam injections in the lower part of a hopper of a feeder screw enabling a homogeneous mixing of the sludge and the steam injected by such a preheating device 2, this mixture typically containing a large quantity of sludge and a small quantity of steam.

Typically, the quantity of steam injected by the preheating device 2 represents 5 to 25 wt. % of the mass of sludge channeled to the preheating device 2, typically 10%.

The preheating of the sludge is done typically at a temperature between 50 and 150° C., preferably above 70° C. (preferably between 70 and 80° C.). Such a temperature makes it possible to use a simplified pump 3 downstream from the preheating device 2. In fact, such a steam injection by the preheating device 2 results in a slight reduction of the dryness of the sludge. For example, the sludge has a dryness of 20% in the pump 1 upstream from the preheating device 2, and it has a dryness of 18% downstream from the preheating device 2, for example, in the pump 3.

At the outlet from the preheating device 2, the sludge is introduced by a conduit 101 into the pump 3 where it is placed under pressure, typically a pressure between 0.6 and 4 MPa, typically between 2.5 and 3 MPa.

The pumps 1 and 3 work in synchronized manner, depending on the absorption capacity of the reactor 4.

The sludge is then channeled to the reactor 4 by a conduit 102 connecting the pump 3 and the first inlet 11 of the reactor 4.

The first inlet 11 is designed to inject the sludge into the reactor 4.

The sludge is injected directly and continuously into the reactor 4 so as to be rapidly integrated into the mixture contained in the reactor 4. Typically, a shearing action is produced on the sludge in the reactor 4 in the area of the first inlet 11 by virtue of a differential speed effect between the sludge injected at the first inlet 11 (for example, 1 cm/s) and the mixture in circulation in the reactor 4 in the area of the first inlet 11 (for example, 100 cm/s). This differential speed typically has a coefficient between 5 and 300. A different orientation of the respective velocity vectors in question produces the shearing action, which allows a rapid mixing of the small mass of cold sludge injected by the first inlet 11 with the large mass of hot carbonized sludge in circulation in the reactor 4. Thus, this shearing action enables the integration of a small mass of injected sludge into a large mass of sludge uniformly mixed in the reactor 4.

The second inlet 15 is designed to inject the steam directly into the reactor 4, the second inlet 15 being distinct from the first inlet 11.

The interior space of the reactor 4 is configured to ensure a circulation of the mixture in a direction different from the direction of injection of the steam by the second inlet 15. In particular, during the steam injection step, the steam is preferably injected in counterflow to the mixture circulating in the reactor 4.

In the present description, by the term "counterflow" is meant that, for a direction of (mean) circulation of the sludge in the reactor 4 in the vicinity of the second inlet 15 along a principal direction, the direction of steam injection has at least one component opposite to the principal direction. In other words, for a direction of (mean) circulation of the sludge in the reactor 4 in the vicinity of the second inlet 15 along a principal direction, the direction of steam injection makes a positive angle with the principal direction between pi/2 and 3*pi/2 radians. Preferably, this angle is pi radians (opposite vectors).

The step of placing in circulation is performed to obtain a uniformly mixed flow. By the term "uniformly mixed" here is meant the fact that a particle of the sludge+steam mixture in the reactor 4 has a probability of reaching any point of the reactor occupied by the sludge+steam mixture identical to the probability of another particle of the sludge+steam mixture reaching the same point. The percentage of uniformity can thus be calculated as being a fraction between a uniform volume of the sludge+steam mixture and the total volume occupied by the sludge+steam mixture. It will be assumed that the reactor is uniformly mixed if one obtains a percentage of uniformity greater than 90% (or in other words, there is not more than a 10% "dead zone" where the particles do not go or do not always go). This uniform volume of the sludge+steam mixture can be measured by a lithium tracing test, which is familiar to the skilled person.

The fact that the reactor is uniformly mixed greatly promotes the chemical reactions, especially in regard to "batch" or piston flow reactors.

The means of placing in circulation (not shown), designed to place the mixture in circulation within the reactor 4, enable a uniform state of the mixture in the reactor 4. They typically comprise a circulator (not shown), such as one of blade type, designed to cause the sludge to circulate in the interior space of the reactor 4 along a circulation path bounded by one or more interior walls (not shown).

By "means of placing in circulation" or "circulator" of the sludge, of the mixture or of a liquid in the reactor is meant in the present description means designed to create or maintain the circulation (i.e. the movement) of the sludge, of the mixture, or of the liquid directly inside the reactor 4, preferably regardless of the amplitude and the direction of the speed of introduction of the sludge into the reactor 4 by the first inlet 11.

According to variants which are not represented, this circulator can involve:
  an agitator with one or more blades, and/or
  a worm screw, and/or
  a pump, and/or
  a sludge recirculation loop, and/or
  a bubbling.

The inside space of the reactor 4 is moreover configured to form a degassing volume (not shown) in an upper part of this inside space (that is, a part with higher altitude than other parts of this inside space). The mixture does not circulate in this degassing volume. This degassing volume is designed to recuperate the incondensable gaseous products.

The reactor 4 is also provided with an outlet for the incondensables 13 connecting the degassing volume to an evacuation conduit 30 for optional further processing. This outlet for the incondensables 13 is driven by a valve to control the pressure in the reactor 4.

Preferably, the second inlet 15 is separated from the first inlet by a distance greater than one twelfth of the largest linear dimension of the interior space of the reactor 4. This distance is sufficient to enable the shearing action. This distance is considered to be the shortest distance between two points of the first inlet 11 and the second inlet 15, respectively.

The dwell time of the sludge in the reactor 1 can be determined, for example, with the help of a lithium tracing or a numerical modeling method.

The steam directly injected into the reactor 4 by the second inlet 15 is saturated or superheated at high pressure, typically between 0.6 and 4.5 MPa, typically between 2.5 and 3 MPa, and elevated temperature, typically between 160 and 250° C., typically between 220° C. and 240° C.

Preferably, the direction of steam injection is opposite the direction of circulation of the mixture in circulation in the reactor 4, in the zone situated near the second inlet 15.

This steam injection by the second inlet 15 is done to control the temperature of the mixture in the reactor 4, and to maintain this temperature at a defined value, typically between 140° C. and 270° C., typically between 180° C. and 200° C. This temperature is monitored at one or more places of the reactor 4 to check the homogeneity of the mixture which it contains. The flow rate of the steam so injected by the second inlet 15 is regulated to maintain the temperature at the aforementioned nominal values, making it possible to limit the quantity of steam and optimize the energy balance sheet of the device, unlike the solutions of the prior art which implement an injector-mixer.

According to this mode of realization of the invention, there is the choice of realizing:
  a step of injection of reagent in which a reagent of acid type is injected into the reactor 4 in order to maintain the pH of the sludge contained in the reactor 4 at a value less than 6,
  a step of injection of reagent of a base type into the reactor 4 in order to maintain the pH of the sludge contained in the reactor 4 at a value greater than 8.

The injection of reagent can be regulated with the aid of a pH probe. For example, the one or the other reagent (acid or base) can be injected in automated manner so that a lower or upper pH threshold is reached or exceeded.

For the injecting of a reagent, the reactor 4 comprises a reagent inlet 12 connected to a reagent injection conduit 5.

The injection of reagent makes it possible to accelerate the carbonization reaction. The pH is checked, for example, with the help of a pH probe, either directly in the reactor 4 or in a conduit 103, 104, 105, 106 or 107 downstream from the reactor 4 in which the sludge having undergone the hydrothermal reaction step is circulating.

The sludge outlet 16 is designed to extract continuously from the reactor 4 at least a portion of the mixture which it contains.

The device of the invention in FIG. 1 is also able to carry out at least one cooldown step in which the sludge having undergone the hydrothermal reaction step is cooled down. The at least one cooldown step is described below.

The device is designed to perform a water heating step in which the heat contained in the sludge extracted from the reactor 4 is transferred to the water by means of the heat exchanger 6, and in which the water so heated is utilized to produce the steam utilized during the steam injection step.

To accomplish this, the device of FIG. 1 comprises a heat exchanger 6 connected to the sludge outlet 16 by the conduit 103. This device also contains a boiler 22 connected to this heat exchanger 6 by a conduit 21. This heat exchanger 6 is designed to transfer heat contained in the sludge extracted from the reactor 4 to water circulating between this heat exchanger 6 and the boiler 22 by the conduit 21. The boiler 22, powered by another energy source (not shown), is designed to supply the steam injected directly into the reactor 4 via a conduit 23 connected to the second inlet 15.

The water circulating in this heat exchanger 6 is typically heated up to a temperature between 120 and 260° C., typically between 160 and 170° C. This water heated in the heat exchanger 6 is taken to the boiler 22 by the conduit 21 which will produce the steam injected directly into the reactor 4 by the second inlet 15.

The water arriving by a conduit 20 in this heat exchanger 6 has an adequate quality for the production of steam (softness, demineralization, etc.).

This heat exchanger 6 can be of any type adapted to such an exchange, such as the tube in a tube type, the exhaust pipe type, the tube and shell type, etc.

The device of FIG. 1 furthermore comprises an additional heat exchanger 7 designed to transform into steam the water circulating in this additional heat exchanger 7 by utilizing the heat contained in the sludge extracted from the reactor 4, this steam being the steam injected into the sludge upstream from the reactor 4 by the preheating device 2.

The hydrolyzed sludge, already cooled by the heat exchanger 6, is channeled by the conduit 104 of the heat exchanger 6 to the additional heat exchanger 7. This additional heat exchanger 7 serves to produce saturated or slightly superheated steam intended to be injected into the sludge circulating upstream from the reactor 4 by the preheating device 2. The steam so produced has a pressure between 0.1 and 1 MPa, typically between 0.15 and 0.3 MPa.

The additional heat exchanger 7 is of the flue gas tube scrubber type or any other exchanger able to produce saturated steam.

The water circulating in the additional heat exchanger 7 arrives by a conduit 24 with a quality suitable for the desired steam production, especially in terms of softness, demineralization, etc.

The device of FIG. 1 also comprises a cooldown apparatus 8 designed to cool the sludge extracted from the reactor 4 and coming from the additional heat exchanger 7 by the conduit 105 connecting them. Thus, this cooldown apparatus 8 is mounted downstream from the heat exchanger 6 and the additional heat exchanger 7.

The sludge partially cooled by the heat exchanger 6 and the additional heat exchanger 7 is taken via the conduit 105 into this cooling apparatus 8 which carries out a final cooling step. This cooldown apparatus 8 is implemented such that the temperature of the sludge then channeled to a final dehydration treatment module 10 by the conduits 106, 107 reaches a temperature defined prior to its arrival in this module 10. This defined temperature is typically between 40 and 90° C., typically between 60 and 70° C.

To accomplish this final cooling step, the cooldown apparatus 8 can be an exchanger in which the sludge circulates on the one hand, and on the other hand a fluid such as water, air, or any available cooling fluid. Such a cooling fluid arrives in this cooldown apparatus or exchanger 8 by a conduit 26 and leaves it by a conduit 27. The type of exchanger is, for example, an exchanger of the tube in a tube type, or the tube in a an exhaust circuit type.

At the outlet from this cooldown apparatus 8, the sludge arrives at a laminar flow device 9 by the conduit 106 allowing this sludge to attain a pressure close to atmospheric pressure before the final dehydration treatment in the module 10. The laminar flow device 9 and the final dehydration treatment module 10 are connected to each other by the conduit 107.

This laminar flow device 9 can be a pump, a valve, a diaphragm or any accessory making it possible to lower the pressure of the sludge in this way.

Startup of the Device

The startup of the device of FIG. 1 is done by preheating the reactor 4 with steam injection directly into the reactor 4 via the second inlet 15, this injected steam coming from the boiler 22 by the conduit 23. This preheating of the reactor 4 is done until obtaining an adequate temperature within the reactor 4. This startup phase is performed without injection of sludge into the reactor 4. This preheating of the reactor 4 is done without difficulty, since the reactor 4 has previously been filled with water, and water has slight viscosity. Thus, the steam is injected easily into the water and it condenses to a slight volume, while reheating the mass of water contained in the reactor 4.

When the reactor 4 is hot (having reached said adequate temperature), one may inject the sludge by the first inlet 11 thanks to the pump 3, without necessarily having to place the preheating device 2 in operation. In fact, the continuous injecting of a small quantity of sludge, as compared to the available volume in the reactor 4 (typically 3 hours of dwell time), allows the sludge so injected to very rapidly rise in temperature and thus become liquefied and attain a rheology close to that of water.

Next, by priming the circulation of the sludge in the conduits 103, 104, 105, 106 and 107, the production of steam for the preheating device 2 will be started, allowing the sludge to be preheated upstream from the reactor 4.

Sample Embodiment

The following example will show the usefulness of thermal recuperation in order to greatly reduce the thermal consumption of the process.

Let us assume that the conduit 100 contains sludge of 19% dryness with a flow rate of 2700 kg/h. The sludge is preheated to 70° C. by injection in the preheating device 2 of 262 kg/h of steam at 107° C. and 0.13 MPa.

In this example, we shall ignore the quantity of acid added to the reactor 4.

For the requirements of heating the reactor 4 to 190° C., 707 kg/h of steam at 220° C. and 3 MPa shall be injected therein.

The heat exchanger 6 will make it possible to preheat the water used to produce the steam injected directly into the reactor 4 from 10° C. to 180° C. and to cool the carbonized sludge circulating in this heat exchanger 6 down to a temperature of 152° C.

The additional heat exchanger 7 will make it possible to produce the steam used by the preheating device 2 at 0.13 MPa from water at 10° C., while cooling the carbonized sludge circulating in this additional heat exchanger 7 to a temperature of 103° C.

The cooldown apparatus 8 uses water at 10° C. and will make it possible to cool down to 70° C. the carbonized sludge circulating in this cooldown apparatus 8 prior to its final dehydration in the module 10.

Thus, one recuperates (190–103)/(190–70)=72.5% of the energy put into the device for the needs of its operation.

It should be noted that the hot water produced in the cooldown apparatus 8 can also be utilized for needs other than the operation of the device according to the invention. In this case, 100% of the energy needed for the operation of this device is utilized internally or externally.

FIG. 2 is a schematic view of a second mode of realization of a hydrothermal carbonization layout according to the invention, which will only be described in regard to its differences from the first mode of FIG. 1.

This second mode of realization furthermore comprises an economizer 71 designed to transfer heat contained in the sludge extracted from the reactor 4 to water circulating between this economizer 71 and, on the one hand, the additional heat exchanger 7, and, on the other hand, the heat exchanger 6.

In this example, the economizer 71 is mounted downstream from the additional heat exchanger 7. The sludge is channeled from the additional heat exchanger 7 to this economizer 71 by a conduit 105a. In this example, the economizer 71 is mounted upstream from the cooldown apparatus 8. The sludge is channeled from the economizer 71 to the cooldown apparatus 8 by a conduit 105b.

In this example, water, preferably demineralized, arrives in the economizer 71 by a conduit 711. The water in the conduit 711 is typically at ambient temperature. This water leaves the economizer 71 by a conduit 712, for example at a temperature of 90° C. The conduit 712 is connected to the conduits 24 and 20, for example, via a branch Y71, so as to channel the water heated by the economizer 71 to the additional heat exchanger 7 and to the heat exchanger 6.

One advantage of such a device is the ability to lower to the utmost the temperature of the sludge, thanks to bringing a cold fluid into contact with the already cooled sludge at the end of its path, while recuperating the maximum energy for process requirements.

Of course, the invention is not limited to the examples just described and many arrangements can be added to these examples without leaving the scope of the invention. Moreover, the different characteristics, shapes, variants and modes of realization of the invention can be combined with each other in various combinations as long as they are not incompatible with or exclusive of one another.

The invention claimed is:

1. A method of continuous hydrothermal carbonization of sludge containing organic matter, said sludge having a solids content between 10and 30% by weight, said method involving a hydrothermal reaction carried out in a reactor, said hydrothermal reaction comprising:
   continuously injecting said sludge into the reactor via a first inlet,
   injecting steam into the reactor via a second inlet that is distinct from the first inlet,
   circulating a mixture consisting of the sludge and the steam injected into the reactor, within the reactor,
   continuously extracting at least a portion of the mixture contained in the reactor via a sludge outlet,
   wherein said injecting steam comprises injecting the steam in counterflow to the mixture circulating in the reactor.

2. The method as claimed in claim 1, further comprising preheating the sludge by raising the temperature of the sludge prior to its injection into the reactor up to a temperature of preheating.

3. The method as claimed in claim 2, wherein the temperature of preheating is greater than 100° C., and wherein the pressure of the sludge during said preheating is greater than 0.1MPa.

4. The method as claimed in claim 2, further comprising heating water by transferring heat contained in the sludge extracted from the reactor to water via a heat exchanger, wherein the water so heated is used to produce the steam used in said injecting of steam.

5. The method as claimed in claim 3, further comprising heating water by transferring heat contained in the sludge extracted from the reactor to water via a heat exchanger, wherein the water so heated is used to produce the steam used in said injecting of steam.

6. The method as claimed in claim 2, further comprising injecting a reagent into the reactor to maintain the pH of the sludge contained in the reactor at a value less than 6.

7. The method as claimed in claim 3, further comprising injecting a reagent into the reactor to maintain the pH of the sludge contained in the reactor at a value less than 6.

8. The method as claimed in claim 1, wherein the sludge is introduced directly and continuously into the reactor at a speed which creates a differential speed effect between the sludge injected at the first inlet and the mixture in circulation in the reactor in the area of the first inlet, the differential speed having a coefficient between 5 and 300.

9. The method as claimed in claim 1, further comprising heating water by transferring heat contained in the sludge extracted from the reactor to water via a heat exchanger, wherein the water so heated is used to produce the steam used in said injecting of steam.

10. The method as claimed in claim 9, further comprising injecting a reagent into the reactor to maintain the pH of the sludge contained in the reactor at a value less than 6.

11. The method as claimed in claim 1, further comprising injecting a reagent into the reactor to maintain the pH of the sludge contained in the reactor at a value less than 6.

12. The method as claimed in claim 11, wherein the reagent is an acid.

13. The method as claimed in claim 1, further comprising injecting a reagent into the reactor to maintain the pH of the sludge contained in the reactor at a value greater than 8.

14. The method as claimed in claim 13, wherein the reagent is a base.

* * * * *